UNITED STATES PATENT OFFICE.

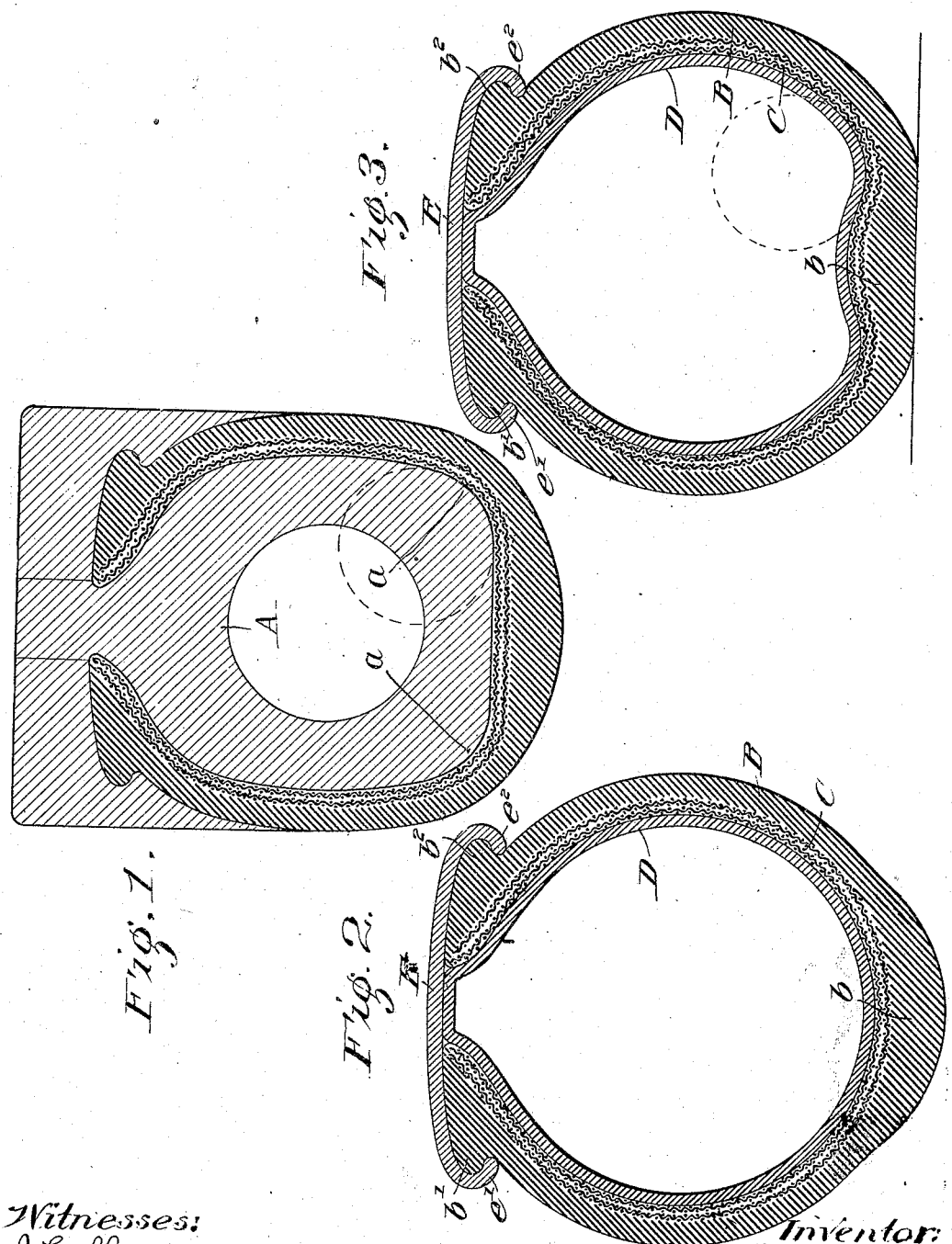

JOHN F. PALMER, OF CHICAGO, ILLINOIS.

TIRE-CASING.

No. 924,268. Specification of Letters Patent. Patented June 8, 1909.

Application filed January 2, 1906. Serial No. 294,113.

*To all whom it may concern:*

Be it known that I, JOHN F. PALMER, a citizen of the United States of America, residing at Chicago, in the county of Cook and State of Illinois, have invented certain new and useful Improvements in Tire-Casings, of which the following is a specification.

My invention relates to improvements in tire casings and is fully described and explained in this specification and shown in the accompanying drawings, in which—

Figure 1 is a transverse section through my improved tire and the mandrel upon which the same is formed; Fig. 2 is a transverse section through the same tire when inflated; and Fig. 3 is a similar section through the tire when inflated and supporting a weight, the section being through the portion of the tire in contact with the ground and flattened by such contact.

In pneumatic tires, particularly the tires on the driving wheels of a motor vehicle, there has heretofore been a large amount of wear for the following reason: When a tire is blown up to a high pressure, it tends to take a form where the inner surface of the tread is curved in the arc of a circle in cross-section, and most tires have been built on mandrels of such form that the tread portions of the tires have a curved inner surface of this form when on the mandrel. Furthermore, most tires have incorporated in their body a plurality of layers of fabric of some kind and these layers are normally of substantially equal tension when laid upon the mandrel and also when the tire is inflated. When, in addition to being inflated, weight is placed upon the ordinary tire, the tread flattens to a greater or less extent dependent upon the amount of internal pressure and the amount of weight applied, and, as a result, the curvature of those portions of the tire on the two sides of the immediate center thereof is increased, the curvature becoming sharper. In other words, if the expression may properly be used, the angle between the side walls of the tire and the tread is decreased and the curve which connects the two parts together is sharpened. In sharpening this curve, either the inner portions of the tire wall must shorten or the outer portions of the tire wall must lengthen. Inasmuch as the fabric of which the tire is composed is usually comparatively non-elastic, but is more or less flexible, the outer layers are unable to expand at all, but act to a certain extent as a hinge about which the flection of the tire wall takes place, and the inner fabric layers are shortened up, crinkled, loosened, and very forcibly crowded together. This crowding and compressing of the inner layers occurs, it will be observed, in each portion of the tire just when that portion is in contact with the ground and is operating to transmit power, i. e. at the time when the tension on the fabric of the tire is at its maximum. As a result of the simultaneous occurrence of the fabric compression and fabric strain, a large amount of wear is caused which would not take place were all threads kept taut at this time.

The ordinary pneumatic tire in common use, wears out (in a very large number of cases) along the lines where the bend from the side walls to the tread occurs when the tire is subjected to pressure and weight, and this wear on the tire occurs first on the inside layers. It frequently happens, for instance, that the inner layers of a tire give out along this line while the outer layers are comparatively intact. This weak point in the tire has been long recognized, but the causes of its weakness have never been appreciated. Various remedies have been attempted, most of which consist in adding strengthening fabric to this weak line. It will be obvious from the foregoing description of the causes of weakness that every extra layer placed upon this portion of the tire wall causes a greater compression of the inner layers and increases rather than decreases the difficulty. The tire illustrated in the accompanying drawings is designed to avoid wear on this weakened line in the following manner: I build the tire over a mandrel, A, which I prefer to make with a flat tread and comparatively flat side walls and with curved portions, a, connecting the tread and side walls. It will be seen that the cross-sectional curvature of these curved portions, $a$, is comparatively sharp, the circle in dotted lines in Fig. 1 showing the radius of the curve. I prefer also to build up the tread of the tire to a considerable thickness as illustrated.

In the accompanying drawings, reference character B indicates the tire casing which is provided with a thickened tread $b$, and with longitudinal ribs $b'$ and $b^2$ around its inner edges, the latter for the purpose of interlocking with the inturned flanges $e'$ and $e^2$ of the rim E. C indicates the strain resisting fabric in the casing B, while D indicates the usual inner tube of a double pneumatic tire.

When the tire is inflated it takes the position shown in Fig. 2 where it is approximately circular in cross-section. In other words, the curved portions of the tire walls connecting the tread and side walls are flattened out to a certain extent, the tendency being to place the outer layers of fabric in said walls under a slight compression. Those portions of the tire which are, however, at any given moment occupying the form illustrated in Fig. 2 are not transmitting much power, and consequently any crowding or crinkling of the fabric is of slight consequence. That portion of the tire, however, which is in contact with the ground and is therefore operating to transmit power from the wheel-rim to the ground occupies the position shown in Fig. 3, where the tread is flattened out and the fabric in the walls takes the form illustrated. It will be seen that in the construction here illustrated, the inner surface of the tread is curved inward slightly, but that the curvature of that portion of the tire on the two sides of the flattened portion is exactly or almost exactly that which it had when it was first built on the mandrel. In this way it is possible to construct a tire which when subjected to both pressure and the weight of the vehicle has all its fabric layers under substantially similar conditions. If, for instance, it be assumed that all the layers be put on the mandrel with equal tension, they will be equally tight when subjected to pressure and weight.

To sum the matter up, I reverse the ordinary pneumatic tire practice. Heretofore it has been customary to build a tire over a mandrel of such form that when the tire is in place on the mandrel it occupies substantially the cross-sectional form which it occupies when subjected to internal pressure but not to weight, whereby the tire when subjected to both weight and pressure takes an abnormal curve on the two sides of the tread portion, with the results already set forth. On the contrary, I build my tire in such form that the portions which are necessarily subjected to the greatest range of curvature occupy their abnormal position when subjected to pressure alone, and return toward their normal position, i. e. the position in which they were built when subjected both to pressure and weight.

As already pointed out, the rubber coating of the tire casing is thickened on the tread. This construction is highly desirable because when the tire is subjected to pressure and weight, the side walls tend to bulge out at the point where the pressure is applied. The thickening of the tread causes the center of the tread to push in at the same time, so that the angle between the two sides of the line separating the tread and the side walls is maintained in its proper relation.

From the foregoing description of my tire, it will be seen that my invention is not at all dependent upon the details of construction involved, nor upon its being constructed in a particular manner or of particular materials. In fact, my invention can be embodied in tires of almost every conceivable shape, form, and substance, the particular form herein shown and described being the one in which I have embodied my invention, and in which I find it works satisfactorily.

I claim as new and desire to secure by Letters Patent:—

1. A pneumatic tire provided with strain resisting fabric therein and in which the curvature of the portions of the wall at each side of the tread is substantially the same both when the tire is inflated and supporting a load and when deflated and not supporting a load.

2. A pneumatic tire provided with a plurality of layers of strain resisting fabric therein and in which the curvature of the portions of the wall at each side of the tread is substantially the same both when the tire is inflated and supporting a load and when deflated and not supporting a load.

3. A pneumatic tire provided with strain-resisting fabric therein and having a tread thicker at the longitudinal center than at the longitudinal sides thereof, and also having a substantially flat internal surface alining with the thickened portion of the tread, whereby when the tire is inflated and supports a load the thickened portion of the tread imparts a reverse curve to the fabric on the tread, thereby giving a curvature to the portions of the tire wall at each side of the tread substantially the same as when the tire is deflated and not supporting a load.

4. A pneumatic tire provided with a plurality of layers of strain-resisting fabric therein and having a tread thicker at the longitudinal center than at the longitudinal sides thereof, and also having a substantially flat internal surface alining with the thickened portion of the tread, whereby when the tire is inflated and supports a load the thickened portion of the tread imparts a reverse curve to the fabric on the tread, thereby giving a curvature to the portions of the tire wall at each side of the tread substantially the same as when the tire is deflated and not supporting a load.

In witness whereof I have signed the above application for Letters Patent at Chicago, in the county of Cook and State of Illinois, this 17th day of December A. D. 1909.

JOHN F. PALMER.

Witnesses:
CHAS. O. SHERVEY,
K. M. CORNWALL.